(No Model.)  8 Sheets—Sheet 1.

H. F. CLARK.
MACHINE FOR MAKING BANDBOXES FROM PASTEBOARD.

No. 544,026.  Patented Aug. 6, 1895.

WITNESSES:

INVENTOR
Henry F. Clark
BY
ATTORNEY (No Model.) 8 Sheets—Sheet 2.

H. F. CLARK.
MACHINE FOR MAKING BANDBOXES FROM PASTEBOARD.

No. 544,026. Patented Aug. 6, 1895.

WITNESSES:
J. F. Finch.
M. T. Lougden.

INVENTOR
Henry F. Clark
BY
M. Smith Jr.
ATTORNEY (No Model.) 8 Sheets—Sheet 3.

H. F. CLARK.
MACHINE FOR MAKING BANDBOXES FROM PASTEBOARD.

No. 544,026. Patented Aug. 6, 1895.

Fig. 3.

WITNESSES:

INVENTOR
Henry F. Clark,
BY
ATTORNEY (No Model.) 8 Sheets—Sheet 5.

H. F. CLARK.
MACHINE FOR MAKING BANDBOXES FROM PASTEBOARD.

No. 544,026. Patented Aug. 6, 1895.

WITNESSES:

INVENTOR
Henry F. Clark,
BY
ATTORNEY (No Model.) 8 Sheets—Sheet 6.
H. F. CLARK.
MACHINE FOR MAKING BANDBOXES FROM PASTEBOARD.
No. 544,026. Patented Aug. 6, 1895.
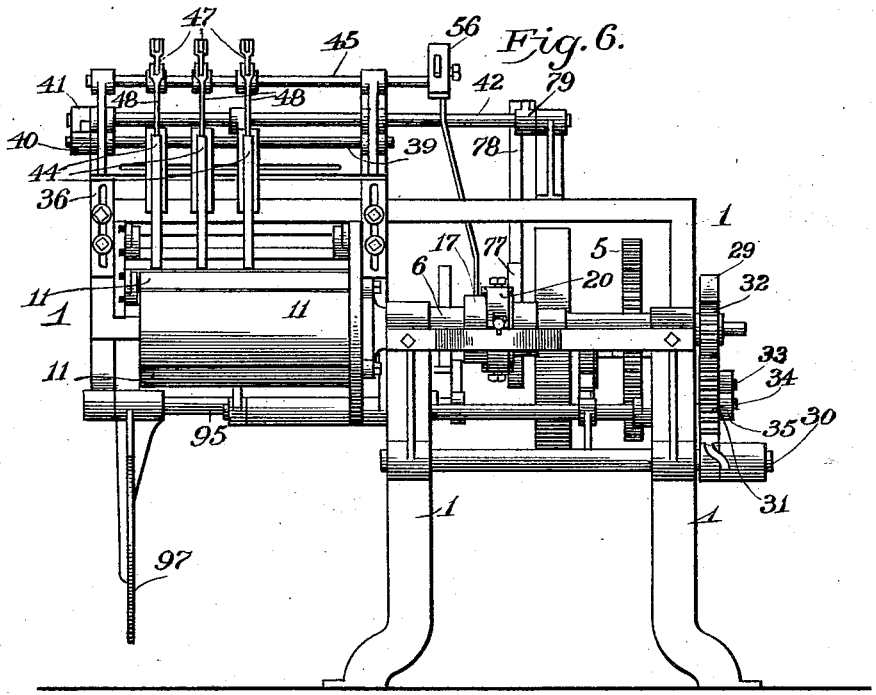
Fig. 6.
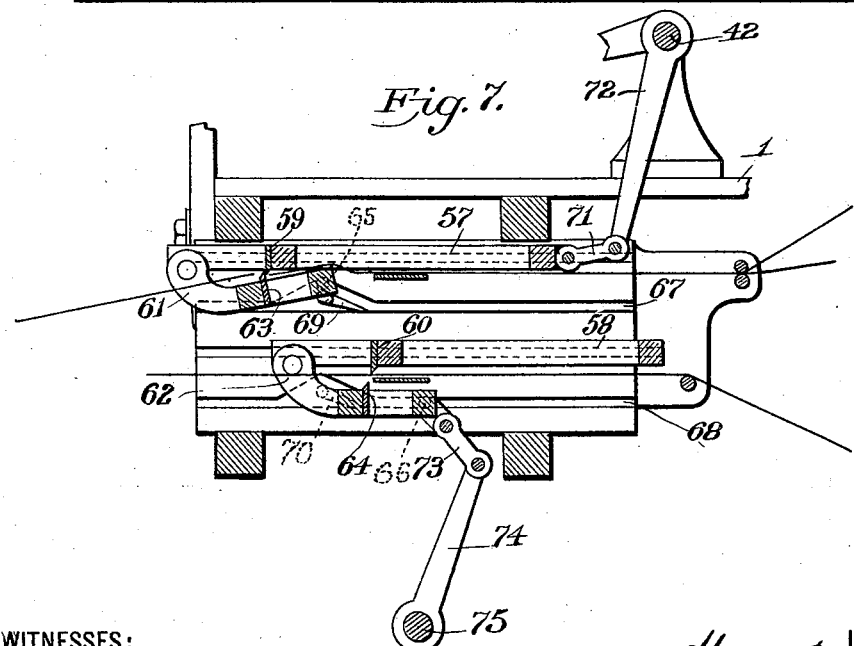
Fig. 7.
WITNESSES:
INVENTOR
Henry F. Clark
BY 
ATTORNEY (No Model.) 8 Sheets—Sheet 7.

H. F. CLARK.
MACHINE FOR MAKING BANDBOXES FROM PASTEBOARD.

No. 544,026. Patented Aug. 6, 1895.

WITNESSES:

INVENTOR
Henry F. Clark
BY
ATTORNEY (No Model.)  8 Sheets—Sheet 8.
H. F. CLARK.
MACHINE FOR MAKING BANDBOXES FROM PASTEBOARD.
No. 544,026. Patented Aug. 6, 1895.
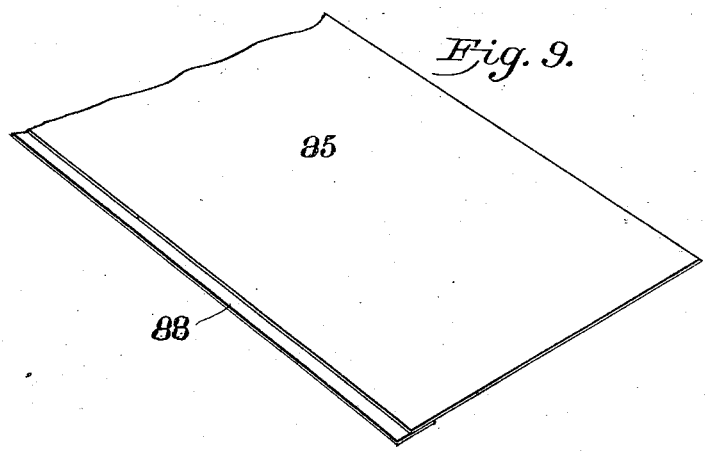
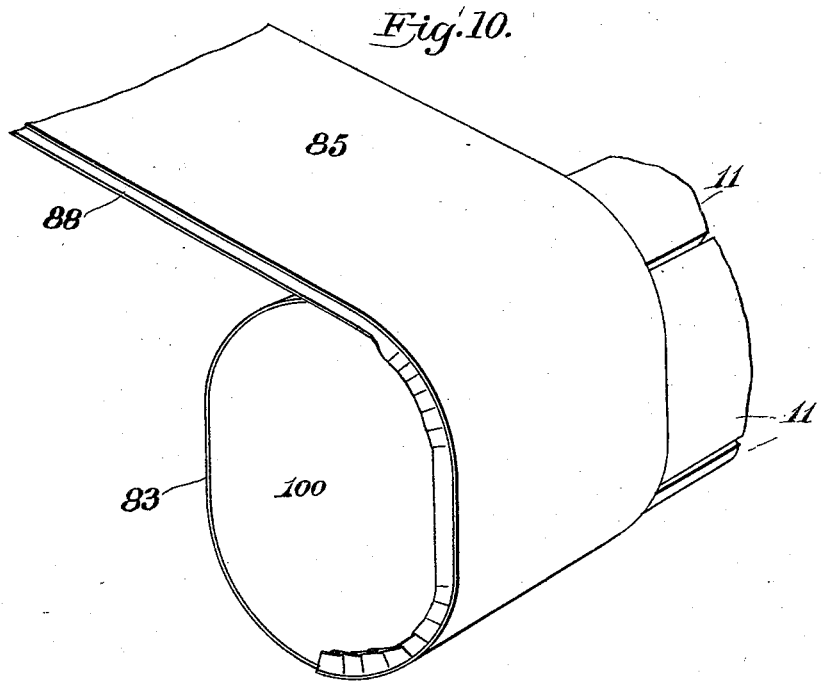

UNITED STATES PATENT OFFICE.

HENRY F. CLARK, OF DANBURY, CONNECTICUT.

MACHINE FOR MAKING BANDBOXES FROM PASTEBOARD.

SPECIFICATION forming part of Letters Patent No. 544,026, dated August 6, 1895.

Application filed November 1, 1894. Serial No. 527,637. (No model.)

*To all whom it may concern:*

Be it known that I, HENRY F. CLARK, a citizen of the United States, residing at Danbury, in the county of Fairfield and State of Connecticut, have invented certain new and useful Improvements in Machines for Making Bandboxes from Pasteboard; and I do hereby declare the following to be a full, clear, and exact description of the invention, such as will enable others skilled in the art to which it appertains to make and use the same.

My invention relates to certain new and useful improvements in machines for making cylindrical pasteboard boxes, such as are commonly known as "bandboxes," and has for its object to manufacture such boxes uniformly, rapidly, and economically.

Figure 1:
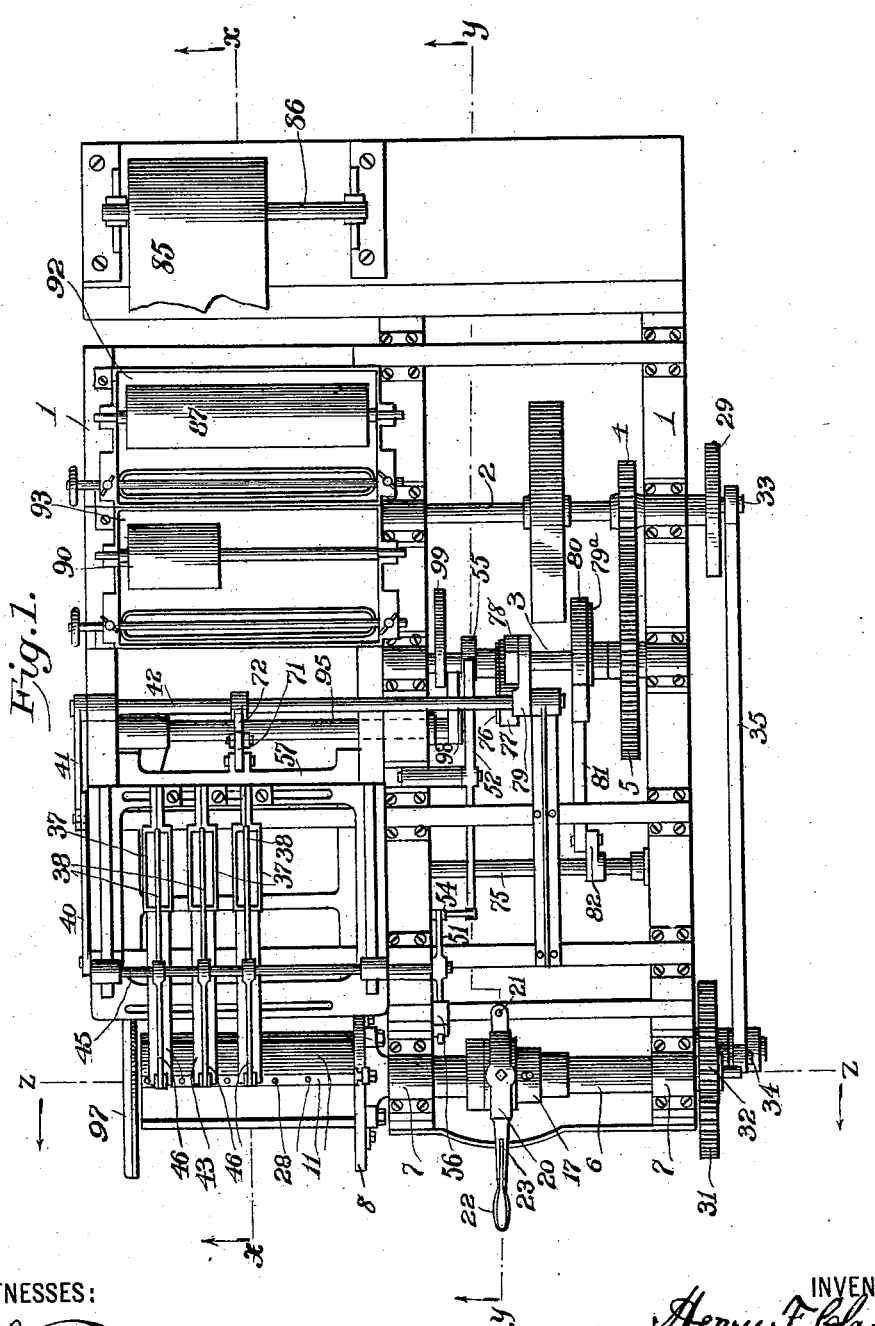
Figure 2:
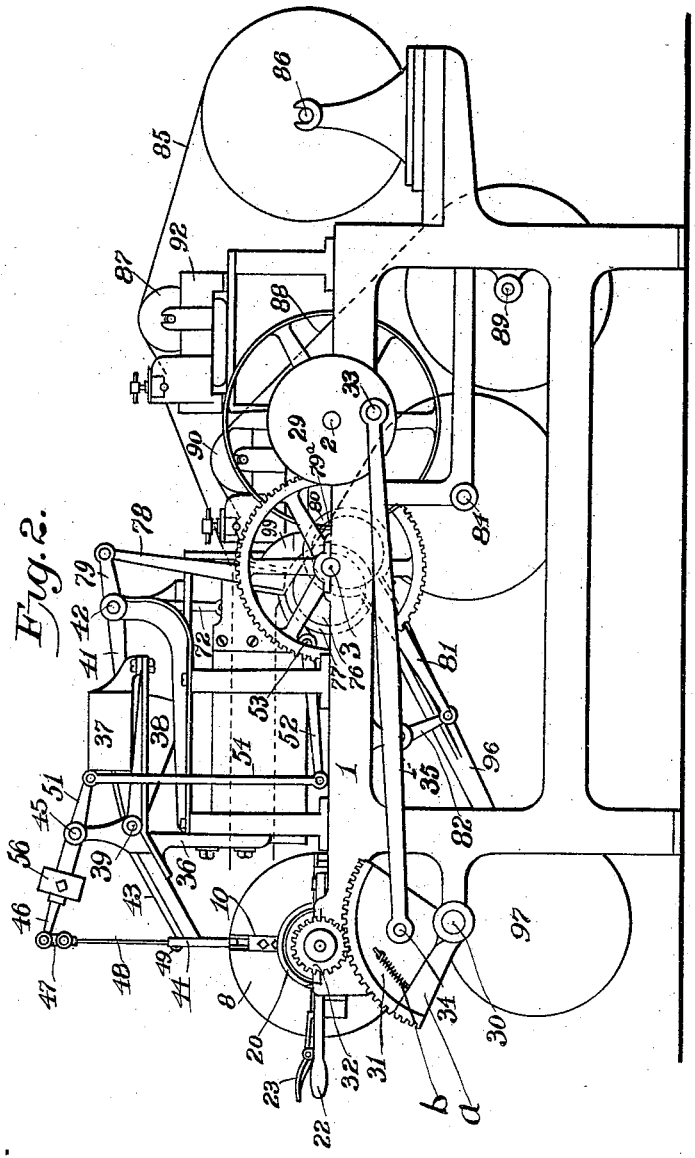
Figure 4:
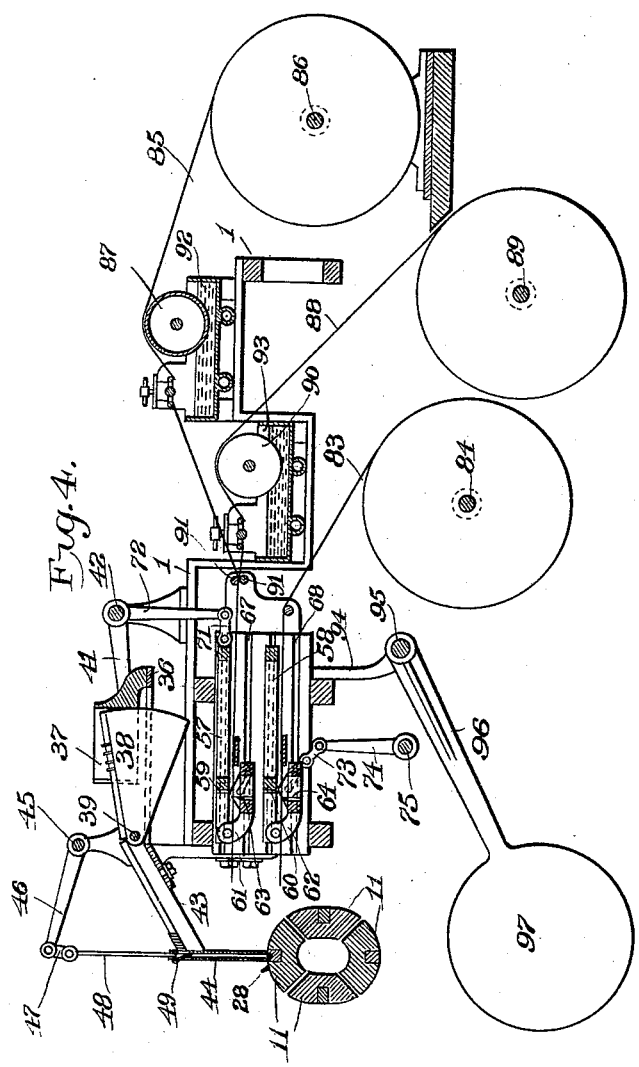
Figure 5:
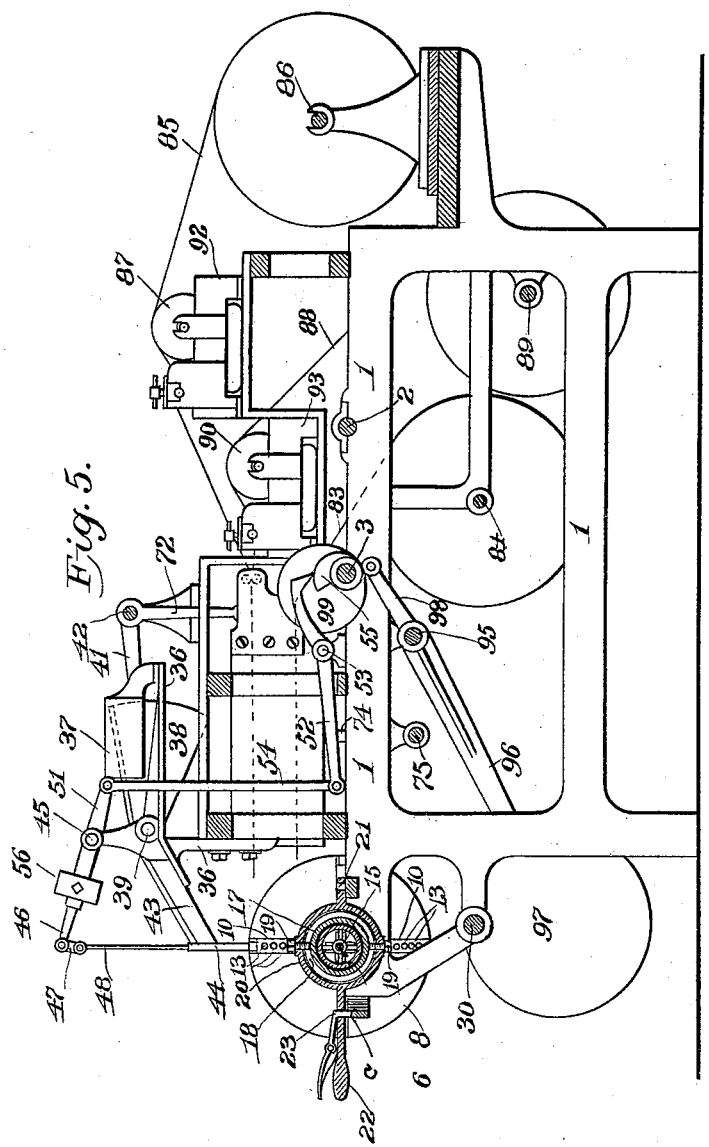
Figure 8:
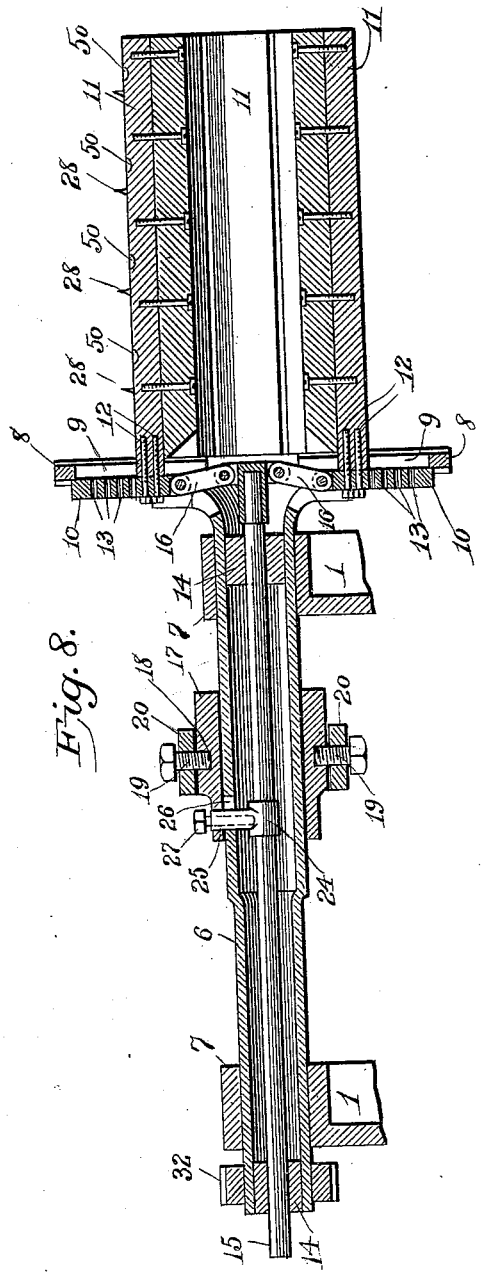

In the accompanying drawings, which form a part of this application, Figure 1 is a plan of my improved machine. Figs. 2 and 3 are elevations looking from opposite sides; Fig. 4, a section at the line $x$ $x$ of Fig. 1; Fig. 5, a section at the line $y$ $y$ of Fig. 1; Fig. 6, a front elevation; Fig. 7, a detail sectional elevation, on an enlarged scale, of the paper-cutting mechanism; Fig. 8, an enlarged section at the line $z$ $z$ of Fig. 1; Fig. 9, a detail perspective of a short section of the covering and fastening strips in their proper relative position as they are drawn around the box, and Fig. 10 a detail perspective illustrating the manner in which the strips are wrapped around the box and the bottom of the latter secured.

Similar numbers and letters of reference denote like parts in the several figures of the drawings.

In my improvement the pasteboard which forms the sides of the boxes is in the form of a continuous roll, and the same is true of the strip of glazed or ornamental paper with which the pasteboard is covered, as well as the narrow strip of Manila paper by which the bottoms of the boxes are secured to the sides.

My machine is not an automatic machine, as will be clear from the description hereinafter to be given.

The covering-strip and the narrow securing-strip are both fed over and upon pasting-rolls, said strips being then brought together between rollers, so that the narrow strip is pasted beneath the covering-strip, a considerable portion of said narrow strip projecting in order to afford means for fastening the bottom of the box. An expansible chuck is used, around which the pasteboard is rolled. Pins project from this chuck, and the operator draws the pasteboard toward the chuck and fastens its edge over said pins, preparatory to the revolution of said chuck, whereby the pasteboard cylinder is formed. The pasteboard is cut off by automatic appliances, and when the cylinder is formed one edge of the board will overlap the other, and while in this position these edges are secured together by metal staples. The strips secured together, as before stated, are now pulled forward by the operator and the under or pasted surface of the covering-strip is placed in contact with the pasteboard cylinder, within one end of which latter a snugly-fitting disk of pasteboard has been placed. The chuck is now revolved, and during said revolution the operator crimps by hand the securing-strip over the edge of the box and firmly against the pasteboard disk, so that it will be readily understood that the latter is thus secured in position, so as to form a bottom to the box. When the chuck is revolved completely around the covering-strip will have been neatly pasted onto the box, automatically-operated appliances having previously severed the strips to a length predetermined by the size of the box. The chuck is now contracted, thereby withdrawing the pins from the box and permitting the latter to be removed.

In the manufacture of a box it is first necessary to form the box completely from the pasteboard before applying any external paper covering, and I will now describe the means whereby this is effected.

1 is the frame of the machine; 2, the power-shaft; 3, a counter-shaft; and 4 5 are intermeshing spur-gears on said shafts 2 3, whereby motion is imparted from the former to the latter.

6 is the chuck-spindle journaled within boxes 7 in the frame, so as to be capable of a free lengthwise sliding movement, and 8 is the chuck-head, which has therein radial slots, 9 and 10 are blocks capable of sliding freely within said slots. 11 are the chuck-jaws whose heel ends extend within said slots and are secured to said blocks by means of screws 12. These blocks are provided with perforations 13, so that the jaws may be secured at the inner or outer ends of said blocks for the obvious purpose of accommodating various sizes of boxes, it being of course understood that the body of the pasteboard box is formed by wrapping the board around the jaws of the chuck. These jaws are all segments of the same circle, so that they present when properly assembled a general cylindrical appearance.

The chuck-spindle is hollow and is provided with interior tight blocks 14, within which is journaled a rod 15, which latter is capable of a free lengthwise movement within its journals. The forward end of this rod 15 is secured to the various blocks 10 by means of pivoted links 16, so that it will be readily understood that when said rod is moved forward the chuck-jaws will be contracted, and when the rod is moved backward said jaws will be distended.

17 is a collar loose around the chuck-spindle and provided with a circumferential groove 18, within which latter extend pins 19, which project from a surrounding yoke 20, the rear of which yoke is pivoted at 21 to the frame of the machine, while projecting from the front portion of the yoke is a handle 22, by means of which said yoke may be swung laterally to and fro. Carried by the handle 22 is a spring-catch 23, which engages with a notch c in the frame of the machine, whereby said yoke may be retained in normal position for the purpose presently explained.

24 is a collar loose around the rod 15 and having a hollow interiorly-threaded extension 25, which projects upwardly through an elongated slot 26 in the chuck-spindle into the collar 17, and 27 is a set-screw which is driven within the extension 25 for the purpose of securing the collar 24 rigid to the rod 15.

When the handle 22 is grasped and the catch 23 withdrawn and the yoke then swung forward, the rod 15 will likewise be moved forward, thereby contracting the jaws, as hereinbefore set forth, but the movement of said rod will of course be limited by the abutment of the extension 25 against the forward wall of the slot 26, and this limitation of movement is desirable, since it is only necessary to contract the jaws sufficiently to enable a box to be removed therefrom. Should a greater normal spread of the jaws be necessary for the purpose of accommodating boxes of a larger size, the jaws are simply secured to the blocks 10 through the perforations 13, which are more remote from the inner ends of said blocks.

28 are pins, which project from the outside of one of the jaws, to which pins the pasteboard is initially fastened preparatory to winding around the jaws.

Mounted on the end of the power-shaft is a disk 29, and mounted upon a shaft 30, journaled in the frame, is a segment-gear 31, which meshes with a spur-wheel 32, tight on the chuck-spindle 6. Loosely mounted on the shaft 30 is a segment-gear $a$, precisely like the gear 31 in all respects except that the gear $a$ has a shorter sectoral portion. This gear $a$ also meshes with the spur-wheel 32, and when the two gears 31 and $a$ are together they present in effect a single segmental gear. $b$ is a coil-spring, the extremities whereof are connected respectively to said gears.

33 34 are crank-pins on the disk 29 and segment 31, respectively, and 35 is a driving-rod, whose ends are loosely pivoted around said pins, so that it will be readily understood that a continued revolution of the disk 29 will cause the segment 31 to be reciprocated back and forth, thereby revolving the chuck first in one direction and then in the other. The object of this revolution of the chuck is first to effect the winding of the pasteboard around the chuck, whereby the body of the box is formed, the reverse revolution affording the operator ample time to place the bottom of the box within the body and to grasp the covering and securing strips and place them in proper contact with the partially formed box. When the segment 31 is reciprocated backward, so as to leave the spur-wheel 32, the segment $a$ will engage with said spur-wheel and will remain stationary in such engagement, the spring $b$ of course yielding to permit the withdrawal of the gear 31. When the gear 31 is swung forward, it will abut against the gear $a$ and will impel the latter, thus causing the spur-wheel 32 to revolve and to mesh perfectly with the teeth on the gear 31. The employment of this segment $a$ is therefore in the nature of a precaution as against the stripping of the teeth on the gear 31. After the pasteboard has been rolled around the chuck to form the body of the box, and prior to any further operations, it becomes necessary to secure the ends of the pasteboard strip thus rolled, and I will now describe the means which I employ for this purpose.

36 is a bracket bolted to the frame of the machine, and supported thereon are hoppers 37.

38 are blades rigid upon a rock-shaft 39, said blades being capable of a vertical reciprocation through slots in the bottoms of the hoppers.

40 is a crank rigid with the shaft 39 and loosely connected with a crank 41, rigid on a rock-shaft 42, the object of which latter shaft will be hereinafter more fully explained. As the shaft 42 rocks it will be clear that the blades 38 will be carried upward and downward within the hoppers.

43 are chutes secured to the bracket 36 and leading downward to vertical wells 44, supported by the bracket, which wells depend to within a short distance from the surface of the chuck-jaws and are open at the bottom.

45 is a rock-shaft and 46 are crank-arms extending therefrom, the extremities of said arms being connected by means of pivoted short links 47 to vertical setting-plungers 48, which latter extend within the wells 44.

The hoppers contain ordinary staples, and as the blades are tilted upward the staples will be picked up astride of the blades and will be allowed to slide down the chutes into the wells. Springs 49, secured to the upper ends of the wells and extending at their free ends against the lower ends of the chutes, block the passage of the staples into the wells until the plungers 48 shall have descended, so as to throw back the springs to permit the lowermost of the staples to enter the wells. As the plungers descend, the staples will be driven through the overlapping edges of the boxes to fasten the same together in the manner very common to devices of this description. The chuck is always in the same position when the setting of these staples is effected, and the jaw which is immediately beneath the wells 44 is provided with depressions 50, which co-operate with the setting-plungers in causing the staples to be clinched.

51 is a crank extending from the shaft 45, and 52 is a lever pivoted at 53 to the frame of the machine, said crank and lever being pivotally connected with the extremities of a pitman 54, whereby motion is imparted from said lever to said crank. The heel end of this lever bears against the surface of a cam 55 mounted on the shaft 3, and a weight 56 is applied to the shaft 45 in such manner as to normally elevate the crank 41, and thereby keep the lever 52 always against the face of the cam 55. This cam is so constructed that it will act on the lever 52 to cause the crank-arms 46 and plungers 48 to be gradually elevated to their highest position, and then to allow the heel end of this lever 52 to suddenly drop, whereby the plungers 48 are forcibly driven downward by reason of the weight 56 to set the staples in the bandbox.

I have heretofore described the mechanisms whereby the pasteboard is rolled to form the body of the box and the overlapping edges secured together by metal staples, and I will now describe the instrumentalities for delivering to the operator the pasteboard itself, as well as the covering and securing strips, and I will also describe the means which I employ to cut off the pasteboard and said strips into predetermined lengths.

Capable of sliding in ways within the frame are separate cutter-blocks 57 58, arranged one above the other and each having secured thereto cutters 59 60. Pivoted to the forward extremities of these blocks are blocks 61 62, which respectively carry cutters 63 64. Projecting laterally from the free extremities of the blocks 61 62 are studs 65 66, (shown only in dotted lines in Fig. 7,) which extend within grooves 67 68 in the frame of the machine. Toward the forward ends of these grooves the latter are diverted upward and the bottoms are formed by the tails of pawls 69 70, which latter are pivoted in the frame, all of which will be clear on reference to Fig. 7. As the blocks 57 58 are driven forward the studs 65 66 will travel upward in the diverted parts of the grooves 67 68, thereby swinging the blocks 61 62 toward the blocks 57 58, and causing the cutters 63 64 to shear past the cutters 59 60.

In order that the cutters may not interfere with the paper during the backward movement of the cutter-blocks, the latter are slightly carried forward after the cutting has been effected, so that the studs 65 66 will pass beyond the pawls 69 70, and when no longer supported by said pawls the blocks 61 62 will drop, thereby separating the cutters, and the return or backward movement of the blocks will cause the studs to be passed beneath the pawls, the latter readily yielding and falling by gravity to their normal position after the studs have passed. The block 57 is connected by means of a pivoted link 71 to a crank 72, which extends from the rock shaft 42, while the block 62 is likewise connected by means of a pivoted link 73 to a crank 74, which extends from the rock-shaft 75, which latter is journaled in the frame of the machine.

76 is an eccentric carried by the shaft 3 and having therearound a strap 77, from which latter projects a rod 78, which latter is pivotally connected with a crank 79 extending from the shaft 42, so that it will be clear that rocking movement is imparted to the last-named shaft directly from the shaft 3. Rocking movement is similarly imparted from this shaft 3 to the shaft 75 by means of an eccentric $79^a$ on the shaft 3, a strap 80 around the eccentric and provided with a projecting-rod 81, which latter is pivotally connected with a crank 82, extending from the shaft 75. The pasteboard strip 83 is fed from a roll carried by a spindle 84, journaled in the frame of the machine, said strip being led between the blocks 58 62.

85 denotes the wide covering-strip which is fed from a roll, carried by a spindle 86, journaled in the frame of the machine, over a pasting-roll 87, and 88 is the narrow securing-strip which is fed from a roll, carried by a spindle 89, journaled in the frame of the machine, and led over a pasting-roll 90. These covering and securing strips are fed one upon the other through idle-rolls 91, so that the narrow or securing strip is pasted to the bottom of the covering-strip, and are thence led between the cutter-blocks 57 61. I will not enter into any description of the devices for applying the paste to the under side of these strips, since they merely comprise paste-pots 92 93, within which the paste-rollers 87 90 revolve.

Journaled in hangers 94, depending from the frame of the machine, is a rock-shaft 95, to which is rigidly secured a lever 96, on the outer end of which a disk 97 is carried, and 98 is a crank secured to said shaft and having its free end bearing against a cam 99 carried by the shaft 3. As the shaft 3 revolves, the cam 99 will act on the crank 98 to cause the disk 97 to be elevated across the front end of the chuck-jaws, the continued movement of said cam allowing said disk to drop by gravity to its lowermost position.

The operation of my improvement, as hereinbefore described, is as follows: The operator grasps the pasteboard strip and by hand secures its edge over the pins 28 on one side of the chuck-jaws, and the machine is then set in motion, thereby causing the gear 31 to swing backward, whereby the chuck is turned around one complete revolution, the pasteboard strip in the meantime being cut off to the desired length. As the chuck revolves the pasteboard will be confined as against springing away from the chuck by the bottoms of the wells 44, and when the chuck has made a complete revolution a box body will be formed with one end overlapping the other. The operator by his hands assists to hold the pasteboard in position around the drum, with one edge overlapping the other, and the cam 55 by this time will have permitted the plungers 48 to be driven downward, thereby setting staples through these overlapping edges, the operator also holding by hand these overlapping edges, so that they will not slip during the stapling operation. During the backward swing of the gear 31 the chuck will be revolved to form the body of the box, as above set forth. During the period which intervenes between the time when the gear 31 in its backward movement leaves the spur-wheel 32 and the time when said gear, during its return or forward movement, comes into mesh with said gear, the overlapping edges are secured by the staples, as aforesaid, and the operator inserts by hand a pasteboard disk 100 to form the bottom of the box. During the reverse movement of the chuck, caused by the forward throw of the segment 31, the operator grasps the attached strips 85 88, pulls them forward, and places them in proper contact with the sides of the box at or about the time when the chuck is stationary, preparatory to being again revolved by the backward movement of the gear 31, and as the latter is swung backward the operator crimps by hand the securing-strip 88 against the disk which forms the bottom of the box, so that by the time the box-body has been completely revolved, it will have been covered by the strip 85, while at the same the bottom will have been secured to the sides by means of the strip 88. When these operations have been completed, as above set forth, the cam 99 will cause the disk 97 to be elevated across the forward end of the chuck and also in close proximity thereto, and thereupon the operator grasps the handle 22 and throws the rod 15 forward in the manner previously explained, so as to withdraw the pins 28 from the box. As the extension 25 strikes the forward wall of the slot 26 the independent movement of the rod 15 will be arrested, but the operator continues to swing the handle 22, the effect of which is to move the chuck-spindle bodily within its bearings and to bring the bottom of the box firmly against the disk 97, thereby "squaring" said bottom within the sides of the box. This last operation is accomplished during the reverse movement of the chuck caused by the forward swing of the segment 31, and the machine is stopped at the end of said forward swing in order to permit of the removal of the completed box from the chuck, and also to enable the operator to secure the paste-board by hand over the pins carried by the chuck for the formation of a succeeding box. Since the chuck itself is revolving during the function performed by the disk 97, it follows that the pinning of the bottom of the box between the chuck and said disk will cause any gatherings in the strip 88 to be uniformly ironed and extended in one direction, thus greatly adding to the neatness and finish of the box.

Having thus fully described my invention, what I claim as new, and desire to secure by Letters Patent, is—

1. The combination of the hollow chuck spindle 6 terminating at the forward end in a head provided with radial slots, perforated blocks 10 confined within said slots and capable of sliding freely therein, the jaws secured to said blocks, the rod 15 supported within said spindle and capable of a free lengthwise movement, the pivoted links 16 connecting said rods and blocks, the extension 25 capable of being rigidly secured to said rod and extended outward through an elongated slot in the spindle, the collar 17 loose around the spindle and to which said extension is secured and provided with a circumferential groove, and the pivoted yoke surrounding said collar and having pins extending within said groove, whereby when said yoke is reciprocated the jaws will be spread and contracted, substantially as set forth.

2. The combination of the disk, means for elevating and lowering the same, the rotary expansible chuck, and means for moving said chuck bodily against said disk when the latter is in elevated position, substantially as set forth.

3. The combination of the rock shaft 95 having rigid therewith the lever 96 carrying a disk 97 and the crank 98, the rotary cam against which the free end of said crank bears, the rotary chuck having its spindle journaled in loose bearings, and means for imparting to said chuck a lengthwise reciprocation, substantially as set forth.

4. The combination of the reciprocatory cutter blocks carrying cutters and having pivoted thereto blocks which also carry cutters and having studs which extend laterally therefrom, the grooves within which said studs extend, the pivoted pawls near the extremities of said grooves whereby the latter are diverted upward, and means for operating said blocks, substantially as set forth.

5. The combination of the blocks 57, 58 capable of sliding within ways and carrying cutters 59, 60 respectively, the blocks 61, 62 pivoted respectively to the first mentioned blocks and carrying cutters 63, 64, the studs 65, 66 extending from the blocks 61, 62 within grooves 67, 68 in the frame of the machine, and the pivoted pawls 69, 70 having their tails inclined downward to the level of said grooves whereby the latter are diverted upward, and means for reciprocating the blocks 57, 58, substantially as set forth.

6. The combination of the block 58 carrying the cutter 60 and having pivoted thereto the block 62 carrying the cutter 64, the stud 66 extending from the block 62 within the groove 68 in the frame of the machine, the pawl 70 pivoted to said frame and having its tail inclined downward to the level of said groove whereby the latter is diverted upward, the rock shaft 75 having extending therefrom the crank 74, the pivoted link 73 whereby said crank and block 62 are connected, the crank 82 on the rock shaft 75, the rotary cam, the strap around the same, and the rod 81 extending from said strap and pivoted to the crank 82, substantially as set forth.

7. In a machine for making pasteboard bandboxes, the combination of the power and secondary shafts provided with intermeshing spur gears, the eccentrics $79^a$ and 76 and cam 55, all carried by said secondary shaft, means for delivering the pasteboard, the covering and securing strips, cutting mechanisms and operative connections between said mechanisms and eccentrics whereby said pasteboard and strips are cut into predetermined lengths, means for assisting to form said pasteboard into the shape of a box with the edges overlapping, and means automatically controlled and operated by connections from the cam 55 for securing said overlapping edges by metal staples, substantially as set forth.

8. In a machine for making pasteboard bandboxes, the combination of a rotary chuck capable of expansion and contraction and provided with fastening pins, means for delivering the pasteboard to the operator, whereby when the edge of said pasteboard is secured to said pins and the drum revolved the sides of the box may be formed, means for cutting the pasteboard into predetermined lengths whereby when the sides of the box are formed the edges will overlap, appliances for securing said edges by staples, instrumentalities for delivering to the operator the covering and securing strips attached together and with their under surfaces covered with paste whereby when said strips are placed in contact with the box after the bottom has been inserted and the chuck revolved said covering strip will be secured around the sides of the box while the securing strip may be crimped by hand over the corner of the box against the bottom thereof, the swinging disk capable of being elevated and lowered, and means for forcing the closed end of the box firmly against said disk, substantially as set forth.

9. In a machine for making bandboxes from pasteboard, the combination of the rotary chuck capable of being distended and contracted and provided with fastening pins, means for delivering the pasteboard strip whereby the edge of the latter may be fastened to said pins, means for revolving the chuck after the pasteboard has been secured thereto, means for cutting said strip into predetermined lengths whereby when the chuck has made a complete revolution the body of a box may be formed with overlapping edges, and means for securing said edges with metallic staples, substantially as set forth.

10. In a machine for making bandboxes from pasteboard, the combination of the rotary chuck capable of being distended and contracted and provided with fastening pins, means for delivering the pasteboard strip whereby the edge of the latter may be fastened to said pins, means for revolving the chuck after the pasteboard has been secured thereto, means for cutting said strip into predetermined lengths whereby when the chuck has made a complete revolution the body of a box may be formed with overlapping edges, means for securing said overlapping edges by metallic staples, means for delivering the covering and securing strips attached together and with their under surfaces covered with paste, and means for revolving the chuck after the covering and securing strips have been applied to the pasteboard body and after the bottom of the box has been inserted, substantially as set forth.

11. In a machine for making bandboxes from pasteboard, the combination of the chuck, means for delivering to the operator the pasteboard, the covering and securing strips in proper relation preparatory to initially attaching them by hand to said chuck and to the partially formed box respectively, means for revolving the chuck throughout the periods when the box is formed and covered, the swinging disk and means for elevating and lowering the same, and means for moving said chuck with the completely formed box thereon toward and against said disk when the latter is in elevated position whereby the bottom of the box is properly set and finished, substantially as set forth.

In testimony whereof I affix my signature in presence of two witnesses.

HENRY F. CLARK.

Witnesses:
 F. W. SMITH, Jr.,
 M. T. LONGDEN.